June 20, 1950 U. RANZI 2,512,438
CENTRIFUGAL SPEED CHANGER
Filed July 24, 1946 2 Sheets-Sheet 1

Inventor
UBALDO RANZI
By
Attorney

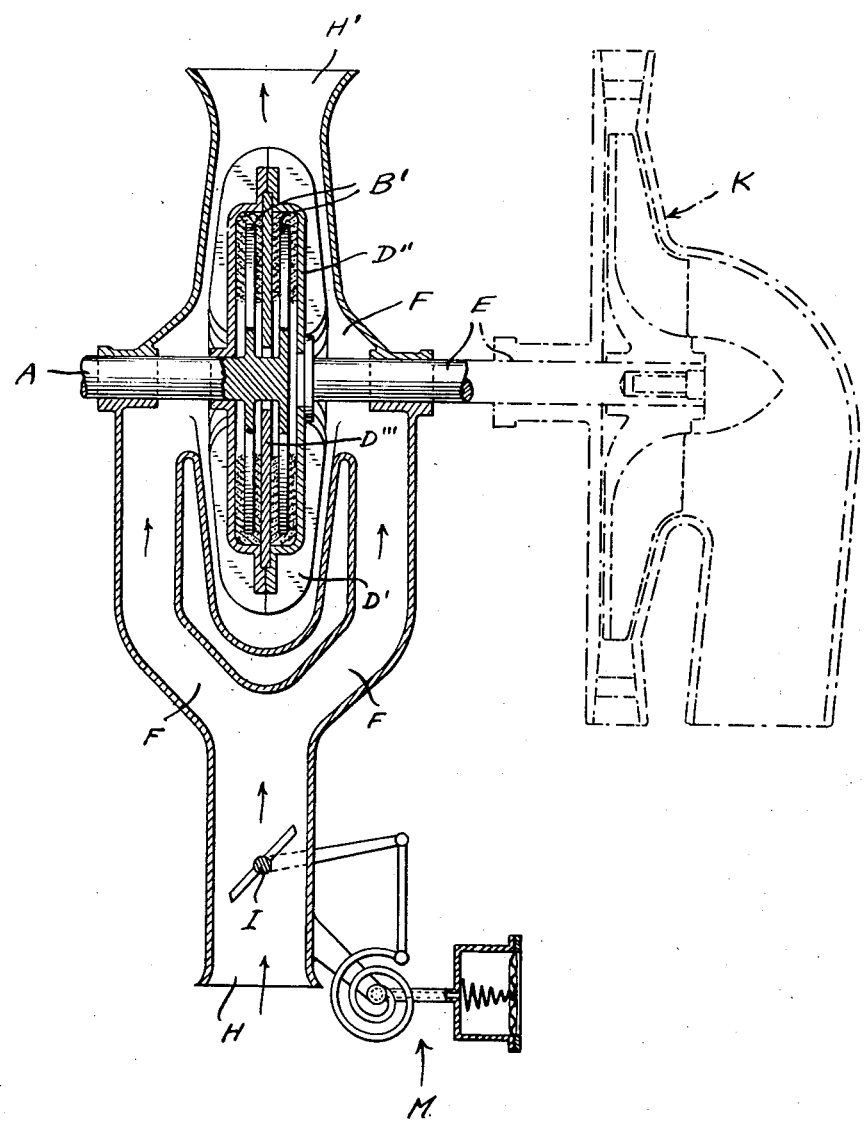

Patented June 20, 1950

2,512,438

UNITED STATES PATENT OFFICE 2,512,438

CENTRIFUGAL SPEED CHANGER

Ubaldo Ranzi, Legnano, Italy

Application July 24, 1946, Serial No. 686,017
In Italy March 18, 1943

Section 1, Public Law 690, August 8, 1946
Patent expires March 18, 1963

3 Claims. (Cl. 230—114)

The present invention relates to speed changers, and more particularly to a centrifugal type coupling wherein the driven portion of the coupling is arranged so as to effect a variable braking action whereby changes in speed may be obtained.

In accordance with certain features of the present invention, a centrifugal coupling, for instance of the type utilizing graphite as a transfer medium between the driven and the driving parts thereof, is modified such that the coupling is housed in a casing and a more or less viscous fluid is driven through the casing and past the rotating parts of the coupling. The coupling itself is provided with projections which coact with the fluid driven past the coupling to effect a braking action whereby, depending upon the degree of viscosity of the fluid driven through the housing, the braking effect is regulated.

The fluid employed for the braking effect may, for instance, be atmospheric air as would be the case when the present coupling is applied to airplane motors in order to automatically regulate the motor compressor speed in accordance with the variation in altitude.

Other objects and features of this invention will become apparent from the following description of the accompanying drawings, wherein:

Fig. 3 is a view of a section similar to that of Fig. 1 illustrating another embodiment of the device in accordance with the invention.

Figure 1:
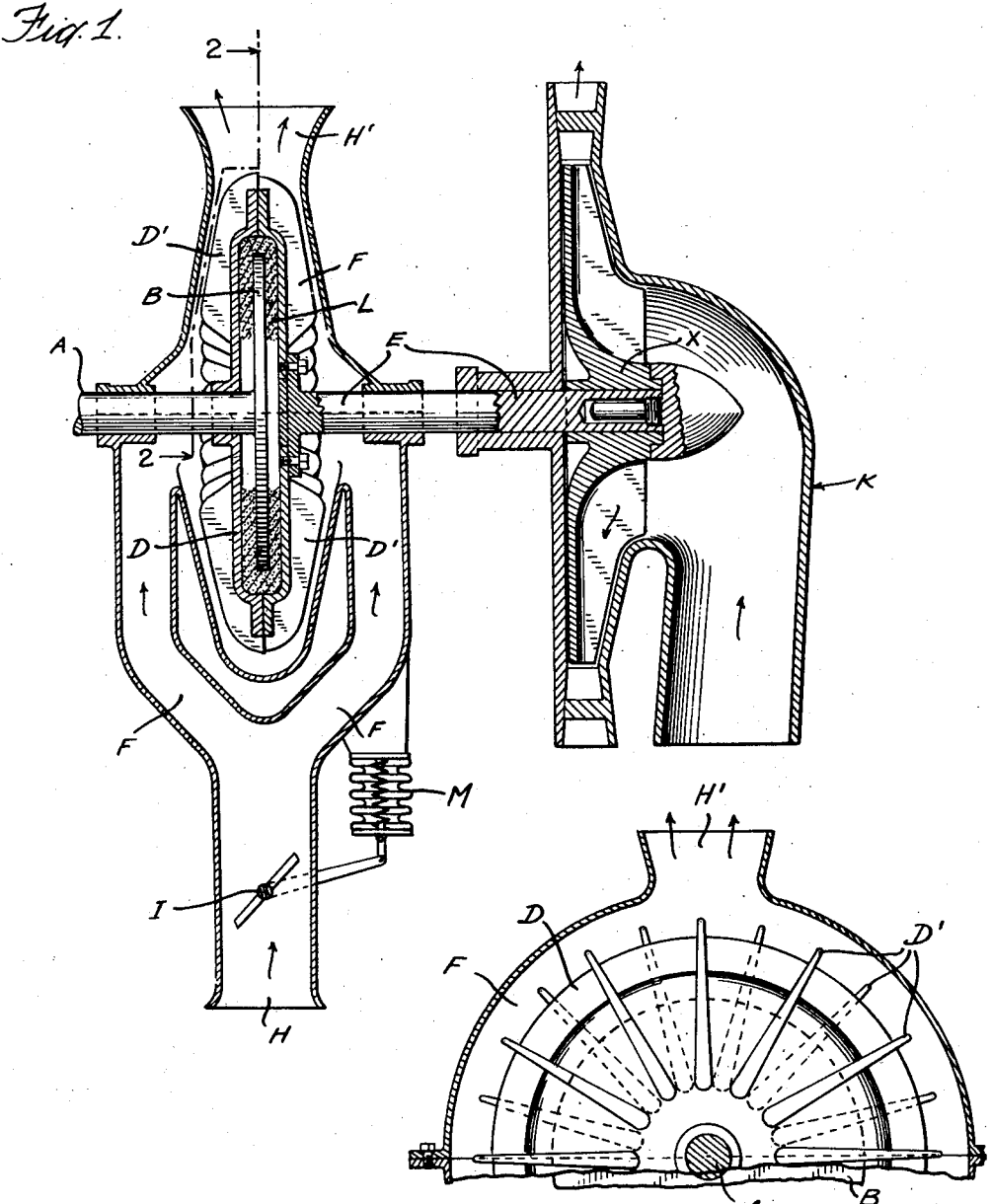
Fig. 1 represents a view in elevation of an axial vertical section of a speed coupler in accordance with the invention.
Figure 2:
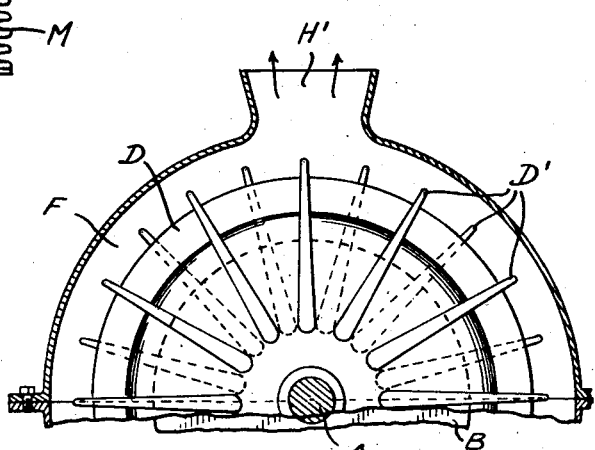
Fig. 2 is a partial view of a section of the device shown in Fig. 1 along the lines 2—2 viewed in the direction of the arrows.

In the view of Fig. 1, the variable speed coupler comprises a driving shaft A which is provided with a drive disc B fixedly secured thereon. The disc B is arranged to rotate within a casing D which is attached to a driven shaft E. In the present embodiment the shaft E forms part of an impeller X for an airplane compressor, generally indicated at K. A quantity of graphite, indicated at L, is interposed between the disc B and the casing D, the centrifugal force of the rotating disc B acting to displace the graphite toward the periphery of the disc and to effect a gradual compression thereof against the inside of the casing D. A gradual transfer of the torque from the drive to the driven shaft is effected in accordance with the degree of compression imparted to the graphite.

In accordance with the invention, the casing D has been provided with projections or fins D'. The casing D is so arranged that it is free to rotate within a chamber F, which is provided with inlet and outlet ducts H and H' respectively for the admission and emission of braking fluid. In the present invention the braking fluid contemplated is air, other fluids however being capable of application herein within the scope of the invention. The inflow of air through the duct H is controllable by means of a throttle valve I.

In the alternative embodiment of the device as shown in Fig. 3, the single disc B of Fig. 1 has been replaced with a plurality, such as two discs B', rotatable within a casing D'', which latter is provided on the inside with a centrally and inwardly extending flange D'''. The flange D''' is preferably arranged intermediate the two discs B' in order to increase the efficiency of transfer of the driving torque from the driving to the driven shafts respectively. The embodiment in Fig. 3 also illustrates an arrangement for the automatic control of fluid admission through the duct H by the provision of atmospheric pressure responsive bellows M, shown coupled to the throttle I in such a way as to effect opening and closing of the valve in accordance with predetermined pressure conditions.

In operation, the rotation of the disc B causes a gradual rotation of the casing D on the driven shaft E through the agency of the graphite until a balance of speed is attained for a given torque and the transmission of the torque is taking place without any slippage between the driving and the driven portions. Upon introduction of a fluid medium such as air into the chamber F, the fins D' act as a brake for the driven part, thereby causing slippage to arise between the driving and the driven portions and to cause a slowing down of the driven part. This braking effect takes place until a new state of equilibrium has been reached as determined by an ultimate decreased velocity of the driven shaft.

By merely regulating the quantity of fluid medium admitted past throttle valve I, a number of possible speeds of the driven shaft E for a given velocity of the driving shaft A may be obtained. The coupling thus effectively acts as a speed changer.

The speed changer has been here illustrated in connection with the impeller of an air compressor for an aircraft motor the velocity of which has to be varied inversely in proportion to the density of the air, that is, the altitude above sea level. At zero altitude the impeller is subject to a partial braking action due to the air passing through the chamber F when the valve I is completely open. With increase in altitude, the valve I undergoes progressive throttling with the result that the braking action is gradually decreased. Due to the provision of the air pressure responsive bellows M the valve is automatically adjusted in accordance with the change in surrounding atmospheric pressure. Thus, it will be possible to attain a condition of torque transfer with zero slippage at a given maximum altitude with a resultant increase in transmission efficiency.

A further advantage provided by the speed changer in accordance with the present invention may be found in the fact that the coupling is subjected to efficient cooling as a consequence of the exposure of the fins D' to the stream of the braking fluid medium passing through the chamber F.

While the invention has been described with reference to a centrifugal coupling of the graphite type and with reference to the application of the changer to an airplane compressor, it will be realized that other types of centrifugal couplings as well as other types of application for the speed changing coupler are contemplated and that the description given above is to be considered by way of example and not as a limitation on the scope of the invention except as expressed in the claims.

I claim,

1. A compressor for an aircraft engine comprising a drive shaft, a centrifugal coupling element on said drive shaft, a driven shaft, another coupling element, having an outer surface, on said driven shaft, a centrifugal impeller for said compressor on said driven shaft, fins on the outer surface of said driven coupling element, a stationary casing enclosing said centrifugal coupling element, inlet and outlet air passages in said stationary casing, throttling means on said inlet passage, and means responsive to atmospheric pressure to actuate said throttling means as the atmospheric pressure changes.

2. A compressor for an aircraft engine, comprising a drive shaft, a disc on said drive shaft, a driven shaft, a finned casing on said driven shaft and enclosing said disc and containing a powdered material, a centrifugal impeller for the compressor on said driven shaft, a stationary casing enclosing said first mentioned casing, inlet and outlet air passages in said stationary casing, throttling means on said inlet passage, and means responsive to atmospheric pressure to actuate said throttling means as the atmospheric pressure changes.

3. A compressor for an aircraft engine comprising a drive shaft, a plurality of parallel discs on said drive shaft, a driven shaft, an impeller for the compressor connected to said driven shaft, a casing on said driven shaft, inner diaphragms in said casing interposed between said discs, outer fins on said casing, and said casing containing a powdered material, a stationary casing enclosing said first mentioned casing, inlet and outlet air passages in said stationary casing, throttling means on said inlet passage, and means responsive to the atmospheric pressure to actuate said throttling means as the atmospheric pressure changes.

UBALDO RANZI.

REFERENCES CITED

The following references are of record in the file of this patent:

UNITED STATES PATENTS

| Number | Name | Date |
|---|---|---|
| 1,350,018 | Gill | Aug. 17, 1920 |
| 1,887,610 | Widegren et al. | Nov. 15, 1932 |
| 2,038,613 | Staats | Apr. 28, 1936 |
| 2,191,320 | Kessler | Feb. 20, 1940 |
| 2,253,877 | Watterson | Aug. 26, 1941 |
| 2,448,824 | Price | Sept. 7, 1948 |

FOREIGN PATENTS

| Number | Country | Date |
|---|---|---|
| 361,389 | Great Britain | Nov. 16, 1931 |